United States Patent
Odachi et al.

(10) Patent No.: US 6,260,422 B1
(45) Date of Patent: Jul. 17, 2001

(54) TORQUE SENSOR AND ROTATION RESTRICTOR FOR STATOR

(75) Inventors: Yasuharu Odachi; Yoichiro Kashiwagi; Takeshi Harasawa; Yoshitaka Kouketsu, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/088,130

(22) Filed: Jun. 1, 1998

(30) Foreign Application Priority Data

Jun. 6, 1997 (JP) .................................................. 9-149520

(51) Int. Cl.[7] ...................................................... G01L 3/10
(52) U.S. Cl. .......................................................... 73/862.334
(58) Field of Search ...................... 73/862.333, 862.334, 73/862.335, 862.325

(56) References Cited

U.S. PATENT DOCUMENTS 4,803,885 * 2/1989 Nonomura et al. ............... 73/862.36
5,526,704 * 6/1996 Hoshina et al. ................. 73/862.335

FOREIGN PATENT DOCUMENTS

| 59-77326 | 5/1984 | (JP) . |
| 5-118938 | 5/1993 | (JP) . |
| 5-180708 | 7/1993 | (JP) . |

* cited by examiner

Primary Examiner—Benjamin R. Fuller
Assistant Examiner—Andre J. Allen
(74) Attorney, Agent, or Firm—Morgan & Finnegan, LLP

(57) ABSTRACT

An improved magnetostrictive torque sensor for sensing torque applied to a shaft that is rotatably supported in a housing. A magnetostrictive cylinder is fixed to the shaft. A stator is supported on the shaft by bearings to surround the magnetostrictive cylinder and is accommodated in the housing. The stator incorporates exciting coils and detecting coils such that the coils are located about the shaft. The magnetostrictive cylinder is strained by torque applied to the shaft. The exciting coils generate flux running through the magnetostrictive cylinder. The generated flux is changed in accordance with the strain of the magnetostrictive cylinder. The detecting coils detect the flux changes. The stator is also rotatably fixed to the housing by bearings. Rotation of the stator relative to the housing is prevented by connectors that couple the stator with the housing. This prevents tension in wires that lead from the stator.

12 Claims, 7 Drawing Sheets

TORQUE SENSOR AND ROTATION RESTRICTOR FOR STATOR

BACKGROUND OF THE INVENTION

The present invention relates to a torque sensor having a stator that detects changes in magnetic flux passing through a magnetostrictive material fixed on a shaft that is rotatable relative to the stator. The present invention also relates to a member for restricting the rotation of the stator.

Magnetostrictive torque sensors typically include a detecting coil, a shaft and magnetostrictive material provided on the peripheral surface of the shaft. Application of torque on the shaft strains the magnetostrictive material and causes changes in the magnetic permeability of the sensor. The changes in the permeability alter flux and thus induce electromotive force in the detecting coil. The applied torque is detected based on the induced electromotive force. Methods for detecting torque applied on the shaft in such sensors are proposed, for example, in Japanese Unexamined Patent Publication No. 5-118938 and Japanese Unexamined Patent Publication No. 59-77326.

In a typical magnetostrictive torque sensor, a shaft is rotatably supported in a housing. A stator having a detecting coil is fixed to the inner wall of the housing. Also, magnetostrictive material is fixed to the shaft. A predetermined gap exists between the stator and the material. However, eccentric rotation of the shaft relative to the housing varies the distance between the stator and the material and thus degrades the performance of the sensor.

A sensor has been proposed in which a stator is supported on a shaft to overcome this drawback. As shown in FIG. 13, a shaft 51 is supported by bearings 53 in a housing 52 and thus rotates relative to the housing 52. A cylinder 54 made of magnetostrictive material is fixed to the shaft 51. Also, a cylindrical stator 55 is rotatably supported on the shaft 51 by bearings 56. The bearings 56 create a predetermined distance between the inner wall of the stator 55 and the surface of the cylinder 54. The stator 55 includes an exciting coil 57 and a detecting coil 58. An alternating electric current is applied to the exciting coil 57. The current forms a magnetic circuit including magnetic flux through the cylinder 54. Application of torque on the shaft 51 strains the cylinder 54 and causes changes in the flux through the cylinder 54. The flux changes are detected by the detecting coil 58. Terminal wires of the coils 57, 58 are soldered to lead wires 59. The lead wires 59 extend through holes 55a formed in the cylinder 55 and holes 52a formed in the housing 52. This construction maintains the predetermined distance between the stator 55 and the cylinder 54 even if the shaft 51 rotates eccentrically relative to the housing 52.

However, due to friction in the bearings 56, rotation of the shaft 51 applies rotational force to the stator 55. Therefore, when the shaft 51 is rotated, the stator 55 is not always fixed relative to the housing 52. In other words, the stator 55 rotates a little relative to the housing 52 as illustrated in FIG. 14. The rotation of the stator applies tension to the lead wires 59 and the terminal wires. The tension can crack the solder connecting the lead wires 59 with the terminal wires. Thus, the terminal wires are likely to be damaged or broken.

Accordingly, it is an objective of the present invention to provide an improved torque sensor in which a stator is rotatable relative to a rotary shaft. Specifically, it is an objective of the present invention to provide a torque sensor and a stator rotation restrictor that prevent terminal wires of a stator from receiving tension and that are easy to assemble.

To achieve the foregoing and other objectives and in accordance with the purpose of the present invention, a torque sensor for sensing torque applied to a shaft that is rotatably supported in a housing is provided. The sensor includes a magnetostrictive member fixed to the shaft and an exciting coil for generating flux running through the magnetostrictive member. The magnetostrictive member is strained by the torque applied to the shaft. A generated flux varies in accordance with the strain of the magnetostrictive member. The sensor further includes a detecting coil for detecting the flux variation, a stator for incorporating the exciting coil and the detecting coil such that the coils are located about the shaft, a support for supporting the stator in the housing and a rotation restrictor for preventing the stator from rotating relative to the housing.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment according to the present invention will now be described with reference to FIGS. 1 to 6.

Figure 6:
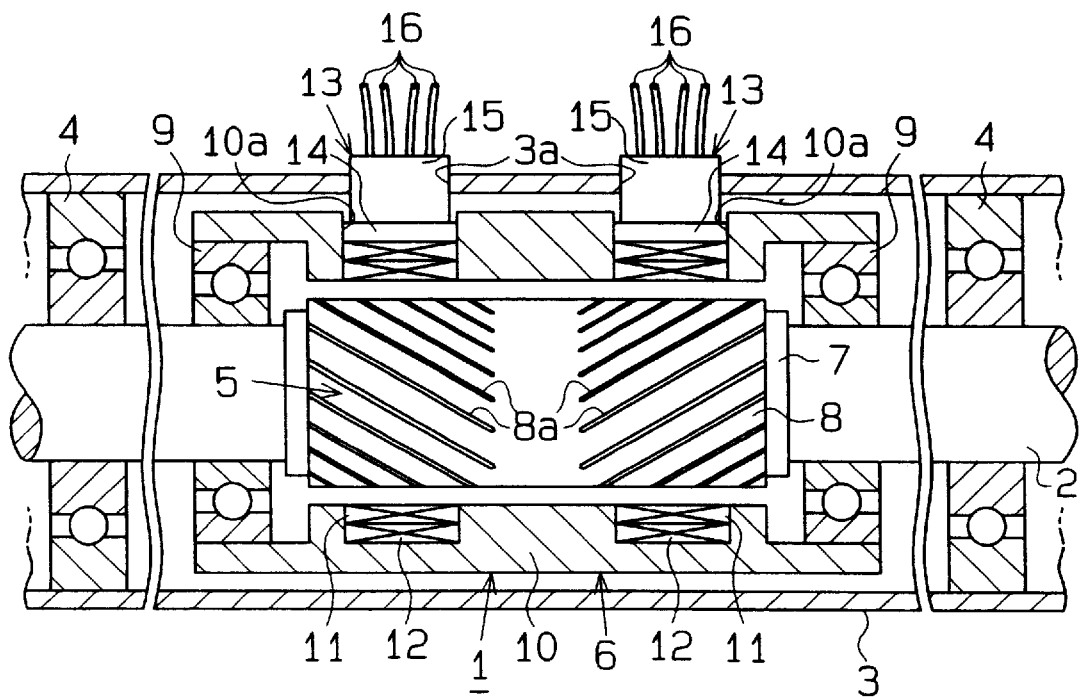
FIG. 6 is a cross-sectional side view illustrating the torque sensor of FIG. 1.

FIG. 6 is a cross-sectional view illustrating a torque sensor 1 provided on a shaft 2. The shaft 2 extends through a substantially cylindrical housing 3 and is supported by bearings 4, which are fixed to the housing 3. The bearings 4 allow the shaft 2 to rotate relative to the housing 3. The torque sensor 1 includes a magnetostrictive detection member 5 and a detector 6. The detection member 5 is fitted about the shaft 2 and the detector 6 detects magnetic changes due to strain of the member 5.

Figure 5:
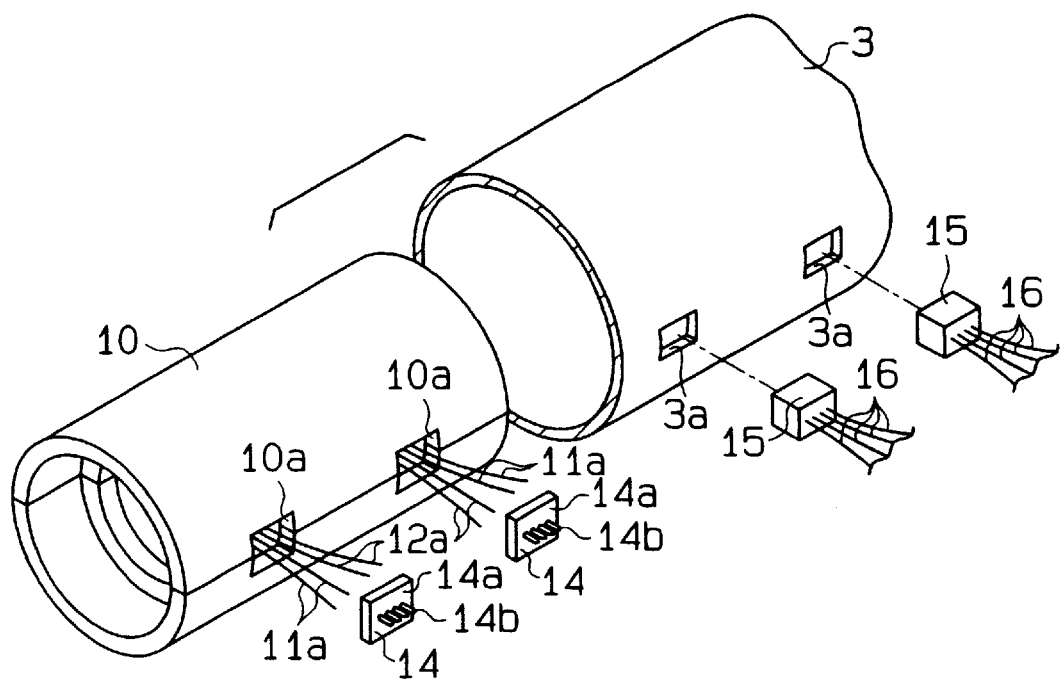
FIG. 5 is an exploded perspective view showing a stator and a housing in the sensor of FIG. 1.

As shown in FIG. 5, the detection member 5 includes a sleeve 7 and a magnetostrictive cylinder 8. The sleeve 7 is fitted about and is welded to the shaft 2. Likewise, the cylinder 8 is fitted about and is welded to the sleeve 7. The cylinder 8 is therefore rotated integrally with the shaft 2. The cylinder 8 includes a core and a magnetostrictive film formed on the core. The film is made of a soft magnetic material having a magnetostrictive property and a high magnetic permeability such as permalloy, iron-nickel-chromium alloy or iron-nickel-chromium-titanium alloy. The surface of the cylinder 8 is divided into two detection regions. Grooves 8a are formed in each region. The grooves 8a are equally spaced apart. The grooves 8a in one region are inclined by forty-five degrees relative to the axis of the shaft 2, whereas the grooves 8a in the other region are inclined by minus forty-five degrees relative to the axis. An iron-aluminum based magnetostrictive material or an amorphous magnetostrictive material may also be used for the film on the cylinder 8.

As shown in FIG. 6, the detector 6 includes a stator 10. The stator 10 is supported on the shaft 2 by two bearings 9 and thus rotates relative to the shaft 2. Two annular recesses are formed in the inner surface of the stator 10. Each recess corresponds to one of the detection regions on the cylinder surface. A bobbin B is accommodated in each recess. An exciting coil 11 and a detecting coil 12 are wound about each bobbin B. The exciting coil 11 is located inside the detecting coil 12. The bearings 9 maintain a predetermined distance between the stator 10 and the cylinder 8.

The exciting coils 11 are connected to an alternating-current power supply and the detecting coils 12 are connected to a conventional signal processor. The signal processor controls alternating current having a predetermined frequency (Hz) supplied to the exciting coils 11. The current produces two magnetic circuits between the stator 10, the cylinder 8 and the stator 10. The flux of the magnetic circuits runs along and between the grooves 8a. Changes in the flux induce electromotive force in the detecting coil 12. Voltage derived from the flux changes is present at the output terminals of the coils 12.

The electromotive force induced by each detecting coil 12 is proportional to the strain produced in the corresponding detection region or to the torque applied to the shaft 2. When torque is applied to the shaft 2, a compressive force acts on one of the detection regions and a tensile force acts on the other region depending on the rotational direction of the shaft 2. A tensile force increases the magnetic permeability of the cylinder 8 and a compression force decreases the magnetic permeability of the cylinder 8. Therefore, the induced electromotive force of each detecting coil 12 increases when the corresponding detection region receives a tensile force and decreases when the region receives a compression force.

The signal processor executes a subtracting process on the induced electromotive force from the detecting coils 12 by a differential circuit (not shown). The signal obtained in the subtracting process is commutated by a commutation circuit incorporated in the signal processor. A conventional circuit then computes the value of the torque applied to the shaft 2 based on the commutated signal. By performing the subtracting process in the differential circuit, external noise caused by temperature changes is offset. This improves the accuracy of the value of the detected torque.

As shown in FIGS. 5 and 6, the stator 10 has two rectangular holes 10a in its circumference. The holes 10a are aligned in the axial direction of the stator 10. Each hole 10a corresponds to one of the bobbins B. The housing 3 has two rectangular holes 3a each radially aligned with one of the holes 10a. A connector 13 is inserted in each radially aligned pair of the holes 3a, and 10a. The holes 10a are larger than the holes 3a. The connectors 13 prevents the stator 10 from rotating relative to the housing 3.

Figure 2:
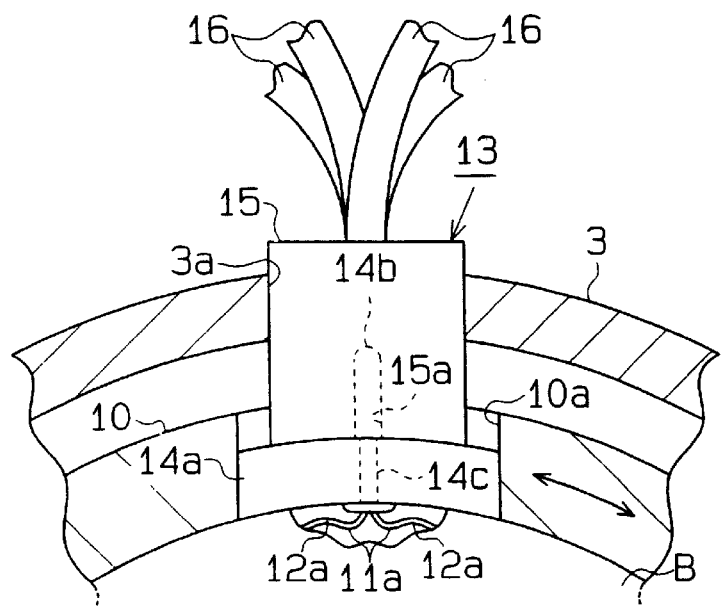
FIG. 2 is an enlarged partial cross-sectional view illustrating the torque sensor of FIG. 1.
Figure 3:
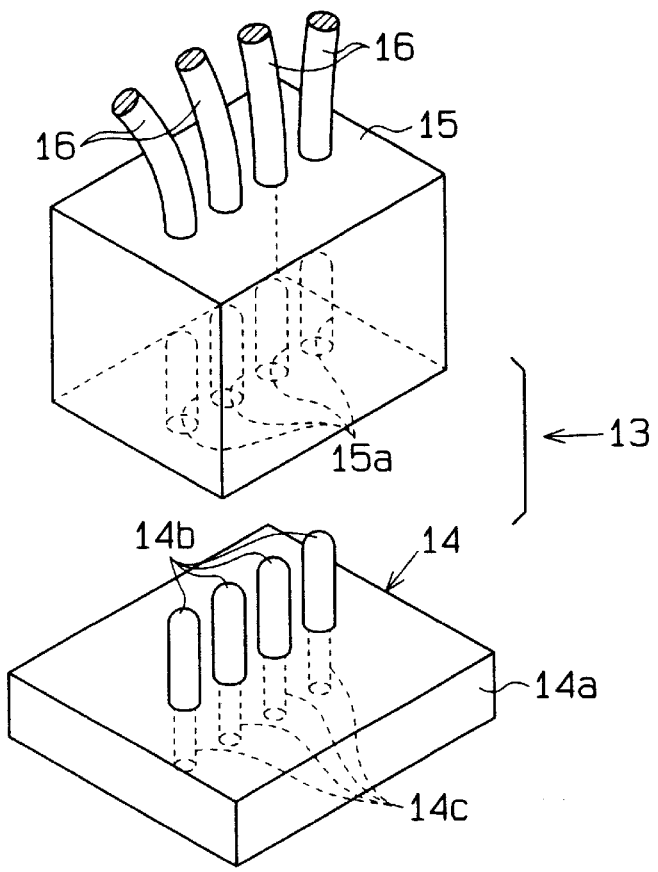
FIG. 3 is an exploded perspective view showing the connector in the sensor of FIG. 1.
Figure 4:
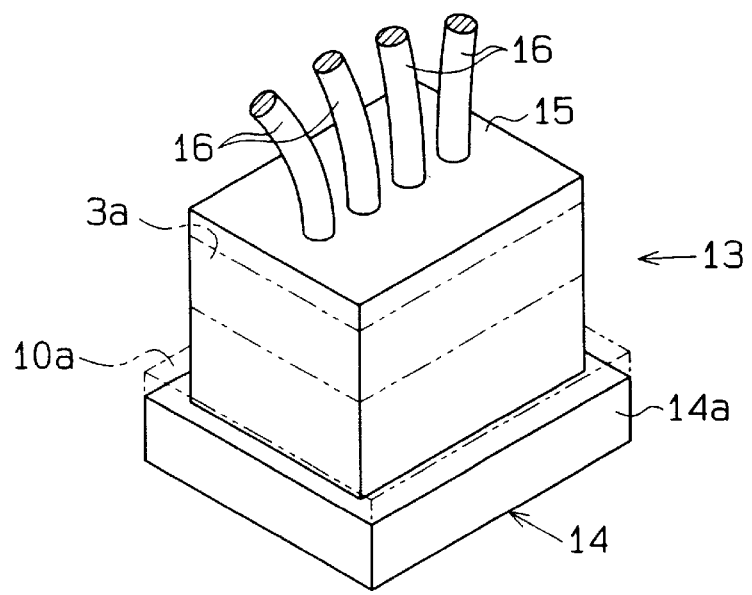
FIG. 4 is a perspective view showing the connector of FIG. 3.

FIGS. 3 and 4 illustrates one of the connectors 13. The connector 13 is made of resin and includes a male connector 14 and a female connector 15. The male connector 14 includes a base 14a and four metal pins 14b. The size of the base 14a is determined such that the base 14a is press fitted into the hole 10a. The inner end 14c of each pin 14b protrudes from the inside of the base 14a. Each exciting coil 11 has terminal wires 11a and each detecting coil 12 has terminal wires 12a (see FIGS. 2 and 5). Each of the wires 11a and 12a is electrically connected to the inner end 14c of each pin 14b by soldering. The bases 14a are press fitted into the holes 10a before inserting the stator 10 into the housing 3. The protruding amount of the pins 14b is determined such that the pins 14b do not contact the inner wall of the housing 3 during the insertion.

The female connector 15 is generally a rectangular solid and has receptacles 15a in its inner surface, or bottom. The number of the receptacles 15a is equal to the number of the pins 14b. The connector 15 also includes lead wires 16 protruding from its outer surface, or top. Each lead wire 16 is electrically connected with one of the receptacles 15a. The male connector 14 and the female connector 15 are mated by inserting the pins 14b in the receptacles 15a. This electrically connects the terminal wires 11a, 12a with the lead wires 16. The size of the female connector 15 is determined such that the connector 15 is fitted into the hole 3a in a manner that permits slight radial movement of the connector 15.

The torque sensor 1 is assembled with the shaft 2 by the following process.

First, the sleeve 7, about which the cylinder 8 is welded, is fitted about the shaft 2. The cylinder 8 is fixed to the shaft 2 to integrally rotate with the shaft 2. The shaft 2 is then inserted in the stator 10 and the bearings 9 are fitted in both ends of the stator 10. The stator 10 is thus rotatably connected to the shaft 2 such that each pair of the coils 11, 12 faces one of the detection regions on the magnetostrictive cylinder 8.

Next, the four terminal wires 11a, 12a extending from each hole 10a of the stator 10 are soldered to the inner ends 14c of the male connector 14. The male connector 14 is then fitted in the hole 10a. In this state, the shaft 2 is inserted in the housing 3. As described above, the distal ends of the pins 14b do not contact the inner wall of the housing 3. In other words, the pins 14b do not hinder the insertion of the shaft 2 into the housing 3. One of the bearings 4 is then fitted to each end of the housing 3 thereby rotatably supporting the shaft 2 in the housing 3.

Figure 1:
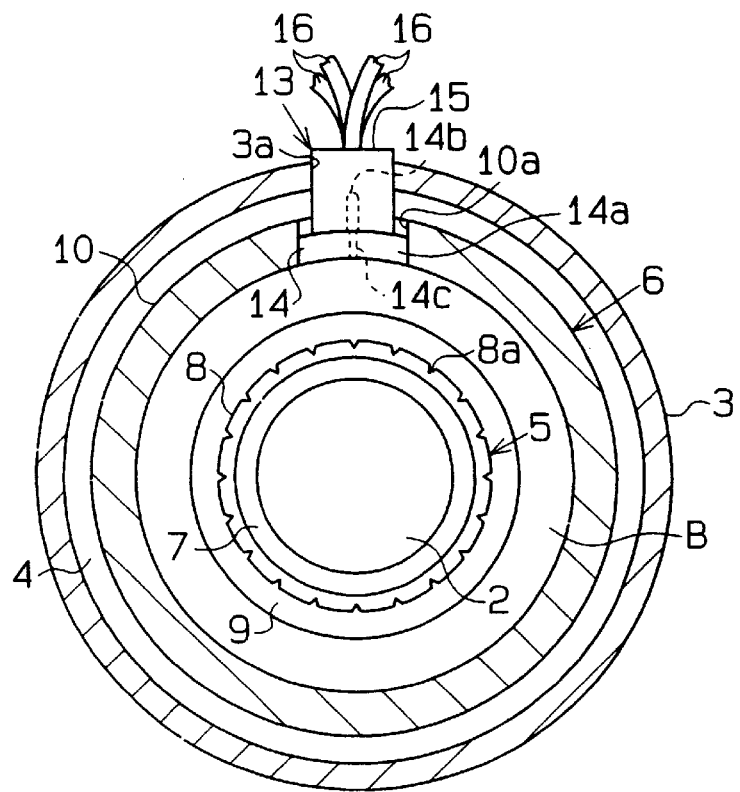
FIG. 1 is a cross-sectional view showing a torque sensor according to a first embodiment of the present invention.

The rotational position of the shaft 2 is adjusted to match the holes 3a of the housing 3 with the holes 10a of the stator 10. The female connectors 15 are fitted to the holes 3a. This inserts the pins 14b in the receptacles 15a of the female connector 15. In this manner, the female connectors 15 are joined with the male connectors 14 as shown in FIGS. 1, 2 and 4. As a result, the terminal wires 11a, 12a are electrically connected with the lead wires 16. Further, the circumferential positions of the female connectors 15 are fixed by the holes 3a. Therefore, the connectors 13, 15 prevent the stator 10 from rotating relative to the housing 3.

When the shaft 2 rotates, friction in the bearings 9 applies rotational force to the stator 10. The force is received by the base 14a and the pins 14b of the connector 13. Therefore, rotation of the stator 10 relative to the housing 3 is restricted. The terminal wires 11a, 12a, which are soldered to the base 14a, do not receive tension. In other words, the solder joints coupling the wires 11a, 12a to the base 14a do not receive tension. The solder joints are thus not cracked or weakened.

Further, the stator 10 is supported by the bearings 9 to be rotatable relative to the shaft 2. Therefore, even if the shaft 2 rotates eccentrically relative to the housing 3, the distance between the stator 10 and the magnetostrictive cylinder 8 is constant.

A conventional torque sensor has a shaft and a stator, and the stator is located about the shaft and is fixed to a housing. This construction varies the distance between the stator and a magnetostrictive material located on the shaft when the shaft rotates eccentrically relative to the housing. This may degrade the detection accuracy of the sensor. Therefore, the shaft axis needs to be centered relative to the housing with a relatively high accuracy. Even if eccentric rotation of the shaft is prevented, the position of the stator relative to the shaft varies depending on the machining accuracy of the housing. This fluctuates the distance between the stator and the magnetostrictive material during operation of the sensor. The machining accuracy of the housing therefore needs to be improved. Also, bearings that couple the shaft to the housing need to be located in the vicinity of the stator for preventing eccentric rotation of the shaft. These measures must be taken by users of the torque sensor. However, in the device of FIGS. 1–6, the stator 10 is rotatable relative to the shaft 2. This construction maintains a constant distance between the stator 10 and the magnetostrictive cylinder 8 thereby solving the drawbacks of the conventional torque sensor.

The embodiment of FIGS. 1 to 6 has the following advantages.

(1) The connectors 13 prevent the stator 10 from rotating relative to the housing 3. This eliminates tension applied on part of the terminal wires 11a, 12a that are connected to the base 14a of the male connector 14. Therefore, the wires 11a, 12a are not damaged or broken.

(2) The male connectors 14 are fitted in the holes 10a of the stator 10. The stator 10 is then fitted about the shaft 2. Thereafter, the shaft 2 with the stator 10a is inserted in the housing 3. The length of the pins 14b is determined such that the pins 14b do not contact the inner wall of the housing 3 during the insertion. Thereafter, the female connectors 15 are fitted in the holes 3a. In this manner, the connectors 13 are easily assembled.

(3) The male connectors 14 and the female connectors 15 are assembled by inserting the pins 14b in the receptacles 15a. Therefore, the female connectors 14 are easily coupled with the male connectors 14 by simply fitting the female connectors 15 in the holes 3a. The connectors 13 are therefore easily assembled. (4) The stator 10 is supported by the bearings 9 to be rotatable relative to the shaft 2. This construction maintains constant distance between the magnetostrictive cylinder 8 and the stator 10. In other words, the distance between the cylinder 8 and the stator 10 does not vary. This improves the detection accuracy of the sensor and eliminates the necessity for high machining accuracy of the housing 3. The construction therefore allows a user to freely change the location of the bearings 4.

The present invention may be alternatively embodied in the following forms: 35 USC 101.

Figure 7:
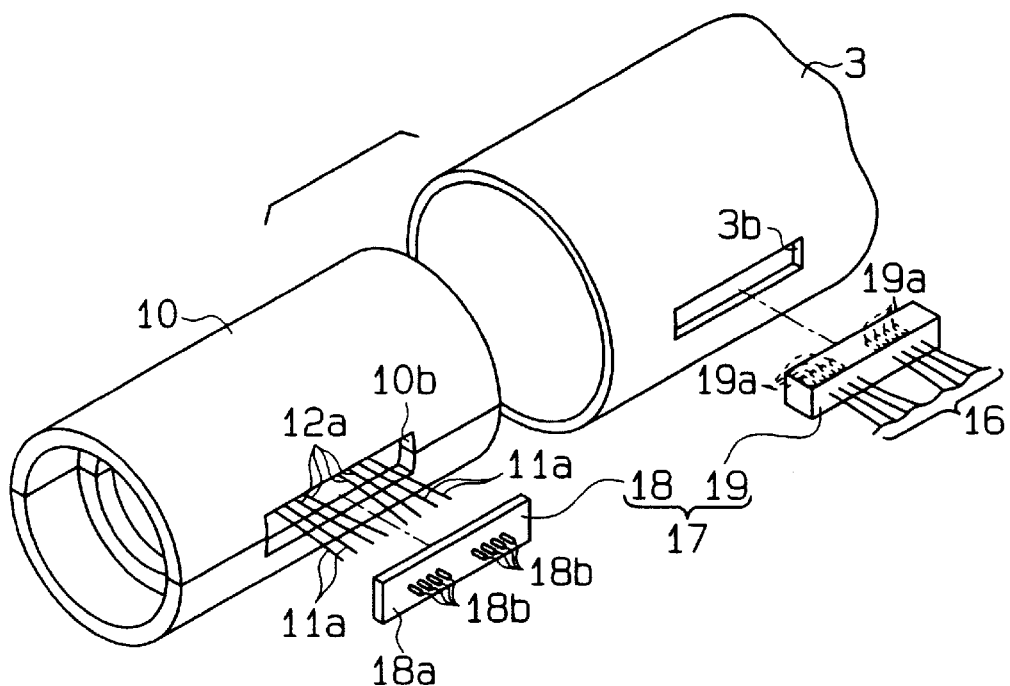
FIG. 7 is an exploded perspective view showing a stator and a housing according to another embodiment.

As shown in FIG. 7, an elongated single hole 10b may be formed in the stator 10 for the terminal wires 11a, 12a of the two bobbins B. In this case, a single connector 17 is fitted to the hole 10b. The connector 17 includes a male connector 18 and a female connector 19. Eight pins 18b protrude from a base 18a of the male connector 18. The pins 18b are aligned in the longitudinal direction of the base 18a. The male connector 18 is press fitted in the hole 10b. The female connector 19 has receptacles 19a in its bottom, or inner surface. Each receptacle 19a corresponds to and receives one of the pins 18b. Eight lead wires 16 extend from the top, or outer, surface of the female connector 19. The housing 3 has a hole 3b, which is radially aligned with the hole 10b. The size of the hole 3b is determined such that the female connector 19 is fitted in the hole 3b while permitting slight radial movements of the connector 19. In this construction, the eight terminal wires 11a, 12a of the bobbins B are connected to the single connector 17. This construction reduces the number of the parts and the number of assembly steps. Further, since the hole 3b is relatively large, the pins 18b are easily mated with the receptacles 19a.

Figure 8:
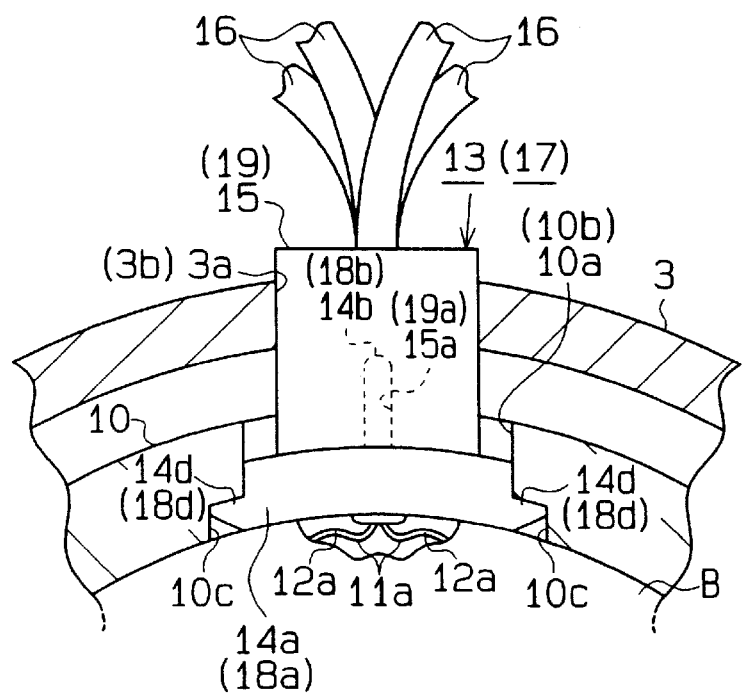
FIG. 8 is an enlarged partial cross-sectional view illustrating a torque sensor according to another embodiment.

In the embodiments of FIGS. 1–6 and 7, steps 10c may be formed at the inner end of the holes 10a (10b) and protrusions 14d (18d) may be formed at the lower portion of the base 14a (18a) as illustrated in FIG. 8. The protrusions 14d (18d) are engaged with the steps 10c. This construction securely fixes the male connectors 14 (18) to the stator 10. Especially, the connectors 13 (17) are firmly fixed to the stator 10 and are prevented from falling out of or moving radially in the holes 10a (10b). The construction therefore effectively prevents the wires 11a, 12a from receiving tension.

Figure 9:
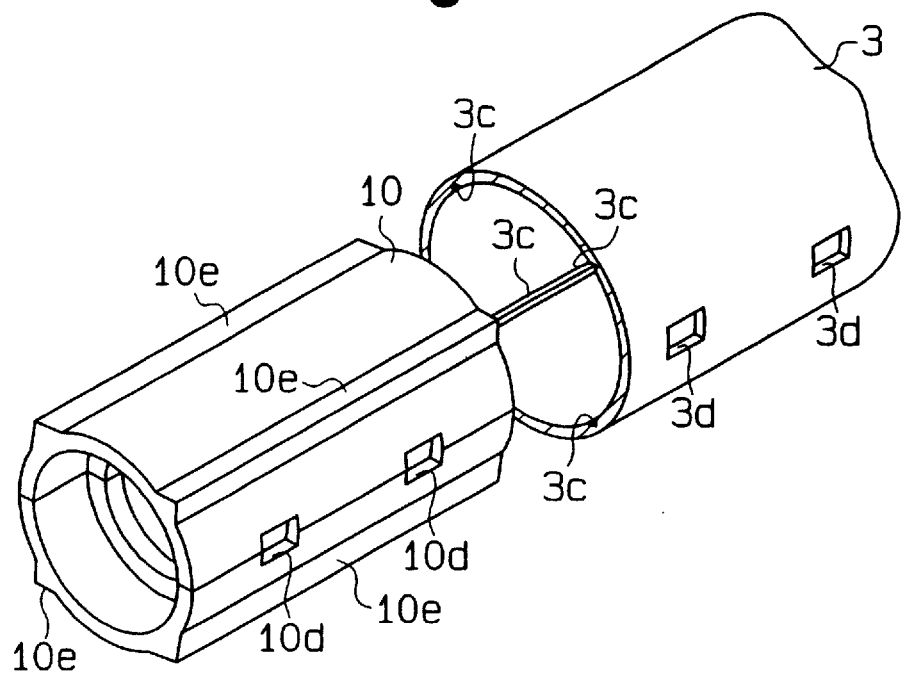
FIG. 9 is an exploded perspective view showing a stator and a housing of a torque sensor according to another embodiment.
Figure 10:
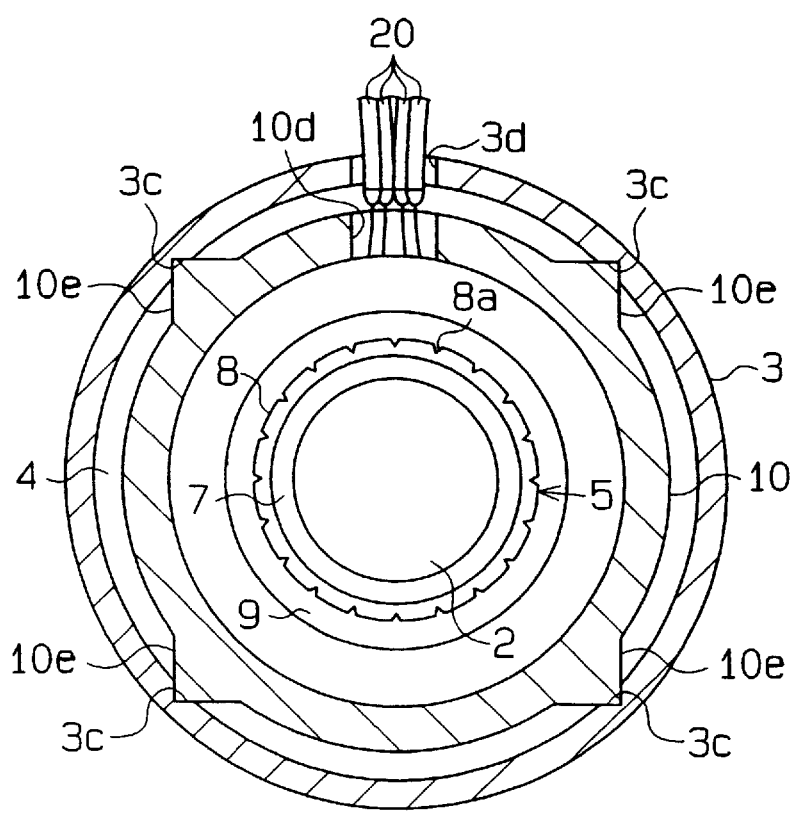
FIG. 10 is a cross-section view illustrating the torque sensor of FIG. 9.

As shown in FIG. 9, axially extending protrusions 10e may be formed on the outer surface of the stator 10 at equal angular intervals (for example, four protrusions 10e at every ninety degrees). In this case, axially extending recesses 3c are formed in the inner wall of the housing 3. Each recess 3c corresponds to one of the protrusions 10e. The stator 10 is slidably supported in the housing 3 by engaging the protrusions 10e with the recesses 3c as shown in FIG. 10. The engagement prevents the stator 10 from rotating relative to the housing 3. The terminal wires 11a, 12a and the lead wires 20 receive no tension and are not damaged or broken. There is a small amount of radial play between the protrusions 10e and the recesses 3c. The play permits eccentric rotation of the shaft 2 due to variations of its dimensional accuracy. Alternatively, the protrusions 10e may be formed on the inner wall of the housing 3 and the recess 3c may be formed in the stator 10.

Figure 11:
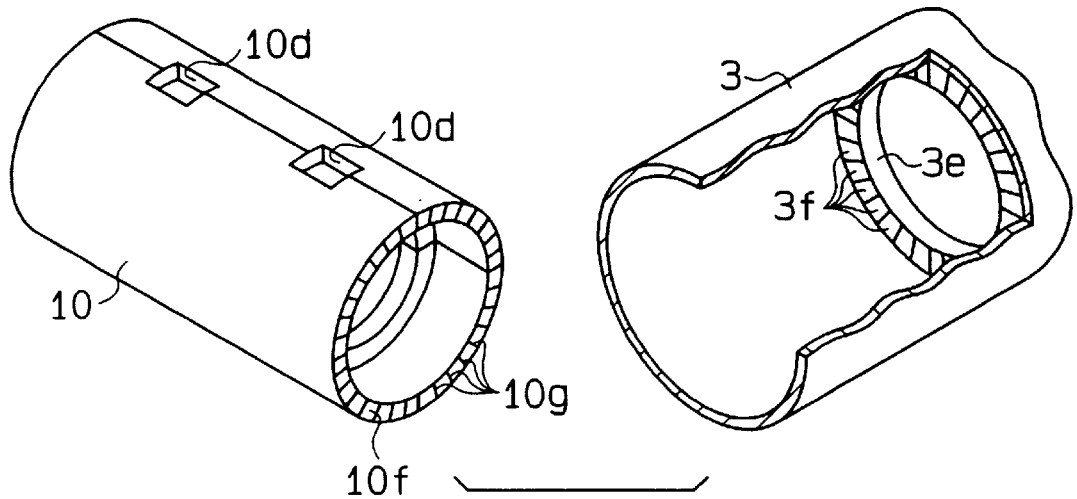
FIG. 11 is an exploded perspective view showing a stator and a housing of a torque sensor according to another embodiment.
Figure 12:
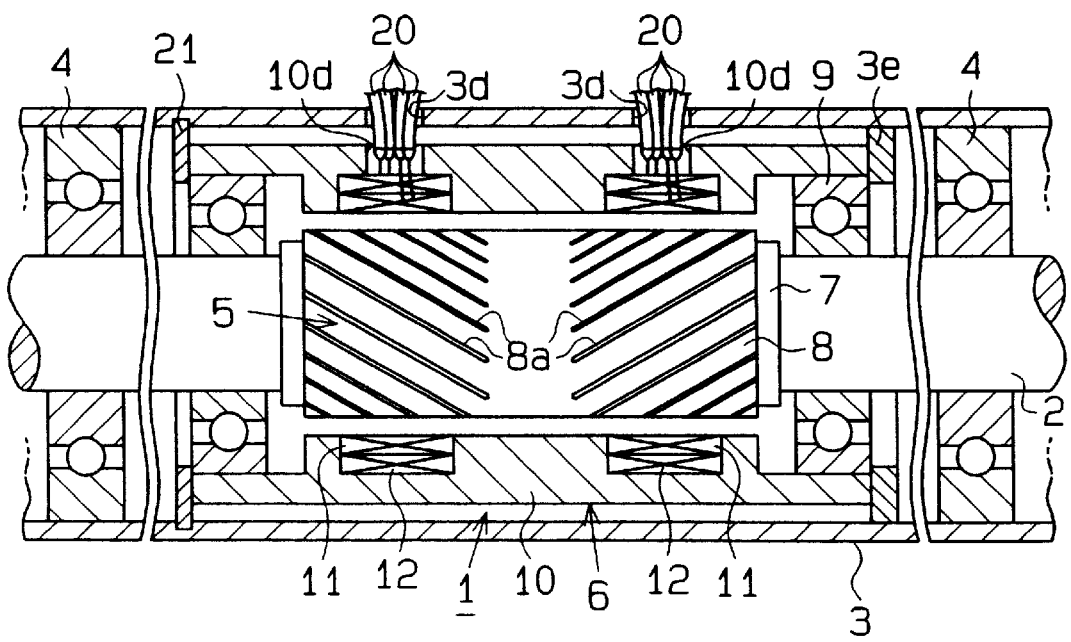
FIG. 12 is a cross-sectional side view illustrating the torque sensor of FIG. 11.
Figure 13:
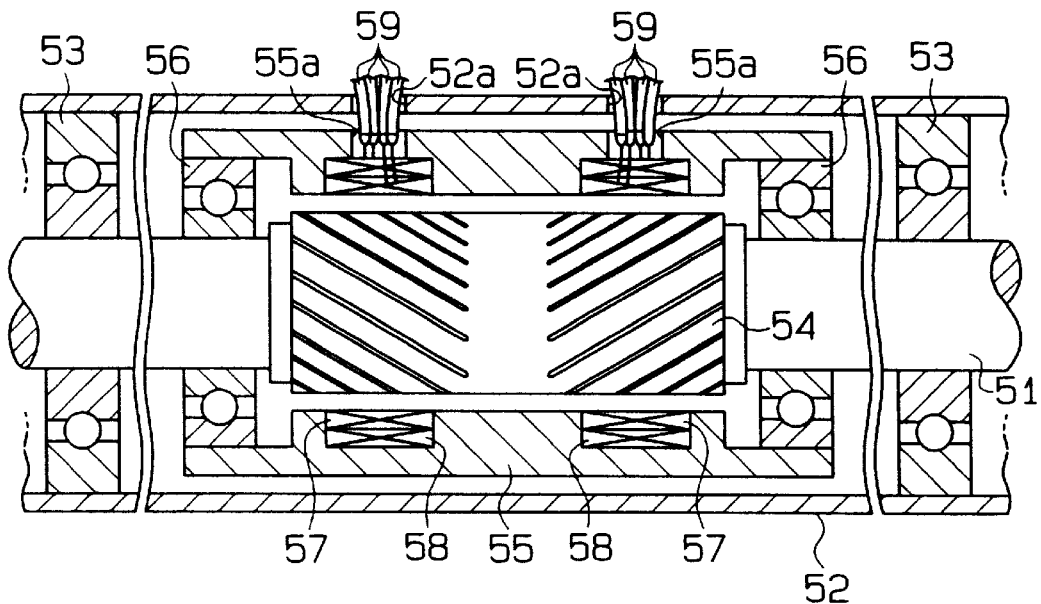
FIG. 13 is a cross-sectional side view illustrating a prior art torque sensor.
Figure 14:
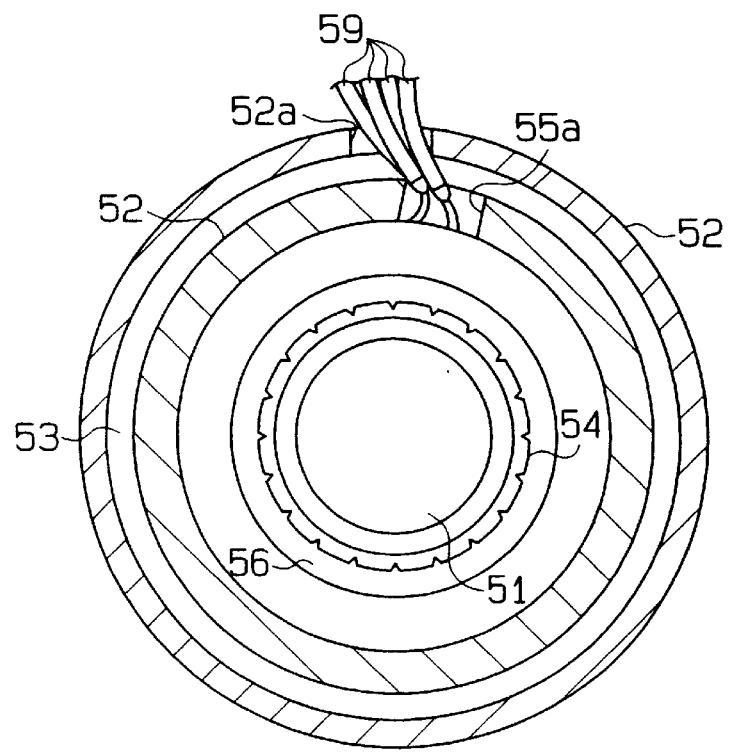
FIG. 14 is a cross-sectional view illustrating the torque sensor of FIG. 13.

As shown in FIG. 11, a ring 3e may be fitted in the housing 3 to contact a first end face 10f of the stator 10. Serrations are formed in the first end face 10f and in a side of the ring 3e that faces the end face 10f. The serrations of the end face 10f form teeth 10g that are equally spaced apart in the circumferential direction. Likewise, the ring 3e has teeth 3f that are equally spaced apart in the circumferential direction. The teeth 10g and the teeth 3f mesh with each other. A snap ring 21 is fitted in the housing 3 at the opposite end of the stator 10 from the ring 3e. The snap ring 21 contacts a second end face of the stator 10 and presses the first end face 10f of the stator 10 against the ring 3e. Therefore, even if rotation of the shaft 2 applies rotational force to the stator 10, engagement of the teeth 3f and 10g prevents the stator 10 from rotating relative to the housing 3. This construction thus prevents the terminal wires of the coils 11, 12 and lead wires 20 connected to the terminal wires from receiving tension. The wires are therefore not damaged or broken.

In the embodiment of FIGS. 1–6, only one connector 13 may be used. The single connector 13 also prevents the stator 10 from rotating relative to the housing 3 and thus prevents the wires 11a, 12a from receiving tension.

In the embodiment illustrated in FIGS. 9 and 10, the protrusions 10e and the grooves 3c may be omitted and other constructions for preventing the stator 10 from rotating may be employed. For example, aligned holes may be formed in the housing 3 and the stator 10 at positions different from the holes 3d and 10d. A connector is fitted in the aligned holes for restricting rotation of the stator 10.

Instead of initially fitting the male connectors 14 in the stator 10, the assembled connectors 13 may be fitted in the holes 10a, 3a before the shaft 2 having the stator 10 is assembled with the housing 3. Specifically, the shaft 2 having the stator 10 is assembled with the housing 3. The assembled connectors 13 are then inserted from the holes 3a and are fitted to the holes 10a and 3a.

A female connector may be fitted in the hole of the stator 10 and a male connector may be fitted in the hole in the housing 3.

The grooves 8a on the cylinder 8 may be omitted. In this case, strain of the cylinder 8 is detected by a cross head type pickup.

What is claimed is:

1. A torque sensor for sensing torque applied to a shaft that is rotatably supported in a housing, the sensor comprising:
    a magnetostrictive member fixed to the shaft;
    an exciting coil for generating magnetic flux running through the magnetostrictive member;
    the magnetostrictive member being strained by the torque applied to the shaft, wherein a generated flux varies in accordance with the strain of the magnetostrictive member
    a detecting coil for detecting the flux variation;
    a stator for incorporating the exciting coil and the detecting coil such that the coils are located about the shaft;
    a support for supporting the stator in the housings, wherein the support rotatably supports the stator on the shaft; and
    a rotation restrictor for preventing the stator from rotating relative to the housing wherein the rotation restrictor comprises:
        a first member attached to the stator, and
        a second member attached to the housing, and wherein the first member and the second member are engaged with each other.

2. The torque sensor according to claim 1, wherein:
    the exciting coil and the detecting coil each have a terminal wire;
    a first member comprises a male connector having a plurality of protrusions;
    the terminal wires of the coils are connected to the male connector;
    the second member comprises a female connector to which leading wire for outputting coil signals is connected, and wherein the female connector has a plurality or recesses with which the protrusions of the male connector are engaged; and wherein
    the terminal wires and the leading wire are electrically connected with each other by engagement of the male connector and the female connector.

3. The torque sensor according to claim 2, wherein the protrusions of the first member are radially separated from the inner wall of the housing.

4. The torque sensor according to claim 1, wherein:
    the stator includes a hole for receiving the first member; and
    the housing includes a hole for receiving the second member.

5. The torque sensor according to claim 4, wherein a step is formed adjacent to the hole of the stator, and wherein the first member includes a protrusion formed to engage with the step.

6. The torque sensor according to claim 1, wherein the support comprises a plurality of bearings that rotatably support the stator on the shaft, wherein the rotation restrictor comprises:
    a plurality of protrusions formed either on the stator or the housing, the protrusions extending in the axial direction; and
    a plurality of recesses formed in the other one of the stator and the housing, wherein the protrusions are engaged with the recesses.

7. The torque sensor according to claim 6, wherein the protrusions are formed on the outer surface of the stator and the recesses are formed in the inner wall of the housing.

8. The torque sensor according to claim 1 further comprising:
    an end face on the stator that is perpendicular to the axis of the shaft;
    a teeth formed on the end face of the stator;
    a ring located in the housing to face the end face of the stator, the ring including a plurality of teeth that mesh with the teeth of the end face of the stator.

9. A torque sensor comprising a housing, a shaft rotatably supported in the housing, a magnetostrictive member fixed to the shaft, a stator and a flux generator for generating flux running through the magnetostrictive member, wherein the magnetostrictive member is strained by torque applied to the shaft, the generated flux is changed in accordance with the strain of the magnetostrictive member, the stator includes a coil for detecting the flux changes, and wherein the stator is rotatably supported on the shaft by a bearing, the torque sensor further comprising:
    a rotation restrictor for preventing the stator from rotating relative to the housing, wherein the rotation restrictor includes a first member that is fixed to the stator and a second member that engages the housing, wherein the stator has a hole for receiving the first member, and wherein the housing has a hole for receiving the second member; and
    coupling means for coupling the first member with the second member.

10. The torque sensor according to claim 9, wherein the coupling means comprises a receptacle formed in one of the first member and the second member and a protrusion formed in the other one of the first and second members wherein the protrusion fits in the receptacle for coupling the first member to the second member.

11. The torque sensor according to claim 10, wherein the protrusion is formed in the first member and wherein the distal end of the protrusion lies radially within and does not interfere with the inner wall of the housing.

12. The torque sensor according to claim 11, wherein the first member comprises a male connector to which a terminal wire of the coil is connected, the second member comprises a female connector to which a leading wire for outputting coil signals is connected, and wherein the terminal wire and the leading wire are electrically connected with each other by engagement of the male connector and the female connector.

* * * * *

UNITED STATES PATENT AND TRADEMARK OFFICE
CERTIFICATE OF CORRECTION

PATENT NO.    : 6,260,422 B1
DATED         : July 17, 2001
INVENTOR(S)   : Yasuharu Odachi et al.

It is certified that error appears in the above-identified patent and that said Letters Patent is hereby corrected as shown below:

Title page,
Item [56], References Cited, U.S. PATENT DOCUMENTS, please change "4,803,885 * 2/1989 Nonomura et al. 73/862.36" to -- 4,803,885 * 2/1989 Nonomura et al. 73/862.360 --;

Item [57], ABSTRACT,
Lines 7-8, please change "The magnetosttrictive cylinder" to -- The magnetostrictive cylinder --;

Column 1,
Line 59, there should be a title that reads -- SUMMARY OF INVENTION --;

Column 4,
Line 10, please change "of the holes 3a , and 10a." to -- of the holes 3a and 10a. --;
Line 17, please change "14ais determined" to -- 14a is determined --;

Column 5,
Line 57, there should be a new paragraph please change "therefore easily assembled. (4) The stator" to -- therefore easily assembled.
       (4) The stator --;
Line 67, please change "the following forms: 35 USC 101." to -- the following forms: --;

Column 6,
Line 49, change "face 1Of of the stator" to -- face 10f of the stator --;

UNITED STATES PATENT AND TRADEMARK OFFICE
CERTIFICATE OF CORRECTION

PATENT NO.     : 6,260,422 B1
DATED          : July 17, 2001
INVENTOR(S)    : Yasuharu Odachi et al.

It is certified that error appears in the above-identified patent and that said Letters Patent is hereby corrected as shown below:

Column 7,
Line 36, please change "the stator in the housings," to -- the stator in the housing, --;
Line 40, please change "relative to the housing wherein the" to -- relative to the housing, wherein the --;
Line 50, please change "a first member" to -- the first member --;
Line 55, please change "which leading wire" to -- which a leading wire --;
Line 57, please change "plurality or recesses with which" to -- plurality of recesses with which --;

Signed and Sealed this

Seventeenth Day of September, 2002

Attest:

JAMES E. ROGAN
Attesting Officer          Director of the United States Patent and Trademark Office